(12) United States Patent
Shirai et al.

(10) Patent No.: US 7,033,659 B2
(45) Date of Patent: Apr. 25, 2006

(54) OPTICAL INFORMATION RECORDING MEDIUM AND METHOD OF RECORDING AND REPRODUCING INFORMATION ON AND FROM OPTICAL INFORMATION RECORDING MEDIUM

(75) Inventors: Hiroshi Shirai, Moriya (JP); Reiji Tamura, Moriya (JP); Kazuyo Umezawa, Sagamihara (JP); Makoto Iimura, Shimotsuma (JP); Akira Kashiwakura, Moriya (JP); Kazuyoshi Adachi, Toride (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/736,712

(22) Filed: Dec. 17, 2003

(65) Prior Publication Data
US 2004/0126623 A1    Jul. 1, 2004

(30) Foreign Application Priority Data
Dec. 26, 2002    (JP)    ............................. 2002-376731

(51) Int. Cl.
*B32B 3/02*    (2006.01)

(52) U.S. Cl. .................. 428/64.1; 428/64.5; 428/64.6; 430/270.13

(58) Field of Classification Search ............... 428/64.1, 428/64.4, 64.5, 64.6, 913; 430/270.13, 945
See application file for complete search history.

(56) References Cited

U.S. PATENT DOCUMENTS
5,498,507 A * 3/1996 Handa et al. ............ 430/273.1
(Continued)

FOREIGN PATENT DOCUMENTS
JP    60-028045 A    2/1985
(Continued)

OTHER PUBLICATIONS
Hansen et al., Constitution of Binary Alloys, Second Edition, pp. 486-489, (1985).
(Continued)

*Primary Examiner*—Elizabeth Mulvaney
(74) *Attorney, Agent, or Firm*—Birch, Stewart, Kolasch & Birch, LLP

(57) ABSTRACT

A write-once optical information recording medium is provided that is capable of realizing a high transfer rate and a method of recording and reproducing information on and from the optical information recording medium. The optical information recording medium is constructed by stacking a reflective layer 12, a first dielectric layer 13, a recording layer 14, a write-protect layer 15, a second dielectric layer 16 and a transparent cover layer 17 on a polycarbonate substrate 11. The recording layer 14 is made of a phase-change material, and the cover layer 17 is made of UV curing resin. The recording layer 14 is irradiated with a laser beam with a wavelength of 500 nm or less to change from a crystalline phase to an amorphous phase. The write-protect layer 15 prevents the recording layer 14 from changing back to the crystalline phase from the amorphous phase, formed by the phase change.

16 Claims, 5 Drawing Sheets

U.S. PATENT DOCUMENTS

| | | | |
|---|---|---|---|
| 5,818,808 A | * | 10/1998 | Takada et al. ............... 369/116 |
| 6,242,157 B1 | | 6/2001 | Tominaga et al. |
| 2004/0106065 A1 | * | 6/2004 | Miyamoto et al. ..... 430/270.13 |

FOREIGN PATENT DOCUMENTS

| JP | 61-168151 A | 7/1986 |
|---|---|---|
| JP | 10-154352 A | 6/1998 |
| JP | 10-226173 A | 8/1998 |

OTHER PUBLICATIONS

English language abstract of JP 2001-209972 (Aug. 3, 2001).

English language abstract of JP 2002-269809 (Sep. 20, 2002).

English language abstract of JP 2003-331461 (Nov. 21, 2003).

* cited by examiner laser beam laser beam laser beam laser beam

OPTICAL INFORMATION RECORDING MEDIUM AND METHOD OF RECORDING AND REPRODUCING INFORMATION ON AND FROM OPTICAL INFORMATION RECORDING MEDIUM

The present invention claims priority under 35 USC § 119(a) to JP 2002-376731, which was filed in Japan on Dec. 26, 2002, and which is incorporated herein by reference in its entirety.

BACKGROUND OF THE INVENTION

The present invention relates to an optical information recording medium and a method of recording and reproducing information on and from an optical information recording medium. More specifically, the present invention relates to an optical information recording medium which can be utilized as a write-once medium capable of realizing a high transfer rate and to a method of recording and reproducing information on and from an optical information recording medium.

Not only computer information but also information such as sound, static images or dynamic images are recently going into a digital form, and the amount of information handled by computers has been extremely increasing. Accompanied by this, information recording media are demanded that are capable of recording and reproducing large quantities of data with high density at high speed. In response to this demand, optical information recording media including DVD-R, DVD-RAM and DVD-RW are being produced. Moreover, because improvements in the processing speed of CPU's and in the maintenance and development of peripheral equipment and software have further progressed, enormous quantities of image information and audio signals are readily becoming freely handled today. Therefore, large-capacity high-speed optical information recording media have been increasingly demanded.

As optical information recording media optical disk which performs recording and reproduction of information by irradiation of a laser beam, two types of optical information recording media, a write-once medium and a rewritable medium, are well known. The write-once medium allows data to be recorded once but not overwritten, and the rewritable medium allows data to be overwritten for multiple times. Since it is impossible to overwrite the information recorded on the write-once medium, the write-once medium is more suitable for recording official documents and the like, preventing the information from being falsified.

There are two types of recording materials widely used for the write-once medium, an organic dye and a phase-change recording materials. An example of the organic dye employed as the recording material is a photosensitive organic dye including benzophenone series dyes, phthalocyanine series dyes, naphthalocyanine series dyes and cyanine series dyes. In the write-once medium which employs the phase-change material, a laser beam irradiates a Te-Ox film, a Te-Ox-Pd film or the like to cause a phase change, and a reflectance change accompanied by this phase change is detected to reproduce information (e.g., refer to Japanese Unexamined Patent Publication Number 61-168151).

To increase the speed demanded for the optical information recording medium, a conventional write-once medium has the following problem: for example, in the case where an organic dye is used as the recording material, recording sensitivity is likely to be insufficient when high-speed recording is performed by increasing a linear velocity of the medium. Thus, it is difficult to achieve a high transfer rate. In addition, the conventional write-once medium has another problem that it is hard to design an organic dye for recording/reproducing light with a short wavelength.

Moreover, in the case of a write-once phase-change recording film which employs a Te-Ox film or a Te-Ox-Pd film, an amorphous recording layer is irradiated with a laser beam to increase the temperature of the recording layer to a range from the crystallization temperature to the melting point, thereby growing crystal grains. Accordingly, crystal recording marks are formed. However, this phase-change process requires a long time to complete the crystallization, and therefore it is difficult to achieve a high transfer rate.

By contrast, in a rewritable medium which employs a phase-change material, a crystalline recording layer formed by, for example, Te—Ge series, As—Te—Ge series, In—Sb—Te and Ga—Sb—Te, is irradiated with a high-power laser beam to fuse. Thereafter, the recording layer is rapidly cooled down from the fused state to form amorphous recording marks. Thus, since the recording marks are formed by changing the phase of the recording layer, from crystalline to amorphous, it takes a relatively short time to form the marks compared with the write-once phase-change recording layer. Therefore, a high transfer rate can be possibility achieved. Furthermore, this crystalline recording layer absorbs the laser beam in a moment and reaches the melting point. Hence, the crystalline recording layer has an advantage over the write-once medium in which an organic dye is decomposed upon recording, that the crystalline recording layer is highly sensitive and the recording power thereof does not largely depend on a recording linear velocity.

In U.S. Pat. No. 6,242,157 of Tominaga et al., there is disclosed a phase change optical recording medium having on a substrate a recording layer consisting essentially of a Sb base thin film and a reactive thin film. The Sb base thin film is formed by depositing a Sb base material containing at least 95 at % of Sb to a thickness of 70–150 Å. The reactive thin film is formed of a material which forms a phase change recording material when mixed with Sb. The reactive thin film is typically formed of an In—Ag—Te or Ge—Te material. Stable write/read characteristics are accomplished at the first overwriting, initializing operation is eliminated, and rewriting is impossible at the same linear velocity as recording.

Under these circumstances, we have been exploring the possibilities for applying the phase-change (crystalline/amorphous) material used in the rewritable medium to the write-once medium. We focused on a phenomenon where it is hard to perform direct overwriting on a rewritable medium of a film incident light type rewritable medium, having the construction of a 1.1 mm-thick substrate, an Ag reflective alloy film, a $ZnS$—$SiO_2$ protective layer, a GeSbTe series recording film, a $ZnS$—$SiO_2$ protective layer and a 0.1 mm-thick cover layer when information is recorded and reproduced by use of a blue laser beam with a wavelength of 405 nm. This phenomenon arises because a spot size of the blue laser beam is smaller than that of a red laser beam and the heat absorptance of the amorphous recording marks is larger than that of the crystalline recording marks. Accordingly, when the amorphous recording marks are irradiated with the blue laser beam, the time required to crystallize the amorphous marks is shorter than that of the red laser beam. Therefore, the amorphous marks are incapable of being completely crystallized, or lengths of the recording marks vary between when information is overwritten on the amorphous recording marks and when information is overwritten in the crystalline spaces.

However, it is difficult to utilize this phase-change (crystalline to amorphous) recording material for the write-once medium because of the following reason. Amorphous recording marks are formed on a crystalline GeSbTe recording film by use of a laser beam. Thereafter, these amorphous recording marks area irradiated with a low-power laser beam for two to three times, and the amorphous recording marks are crystallized. As a result, recorded information is completely erased, and it becomes possible to overwrite new information. Thus, even when information is recorded and reproduced by use of a blue laser with a wavelength of 405 nm, the recording material cannot be utilized for the write-once medium.

SUMMRY OF THE INVENTION

The present invention has been made to overcome the technical difficulties arising when a write-once medium is developed by utilizing a phase-change crystalline recording layer, which is conventionally used for a rewritable medium. An object of the present invention is to provide a write-once optical information recording medium capable of achieving a high transfer rate and a method of recording and reproducing information on and from an optical information recording medium.

To achieve the object, a write-protect layer is provided in an abutting position on a crystalline recording layer in the optical information recording medium to which the present invention is applied. This write-protect layer prevents the recording layer from changing from an amorphous phase to a crystalline phase after being once-recorded. More specifically, the optical information recording medium to which the present invention is applied comprises a substrate, a recording layer and a write-protect layer. The recording layer is provided on the substrate, and the recording layer changes from the crystalline phase to the amorphous phase when irradiated by a light beam so that information is recorded on the recording layer. The write-protect layer is provided in an abutting position on the recording layer and prevents the recording layer from changing from the amorphous phase to the crystalline phase after being once recorded. This write-protect layer prevents the recording layer from reversibly changing back to the crystalline phase from the amorphous phase. The write-protect layer contains an element or a compound which changes chemically or physically at a temperature of 600° C. or more.

In one preferred embodiment, the write-protect layer is characterized by containing a metal containing compound (e.g., a metal oxide or metal nitride compound) that is physically or chemically stable at a temperature of around 200° C., and which is capable of releasing $O_2$ and/or $N_2$ upon being chemically or physically changed at a temperature of 600° C. or more, and more preferably at 800° C. or more; and wherein the thickness of the write-protect layer is preferably in a range from 1 nm to 5 nm inclusive.

In another preferred embodiment, the write-protect layer is characterized by containing at least a cobalt element or a cobalt compound, and the thickness of the write-protect layer is preferably in a range from 1 nm to 5 nm inclusive.

In the present invention, the write-protect layer as described herein can be constructed, if so desired, without using Antimony (Sb) therein, or without using Antimony (Sb) therein in any meaningful or effective amount (e.g., the write-protect layer can be constructed so as to be substantially free of Antimony (Sb)).

Furthermore, in the optical information recording medium to which the present invention is applied, the recording layer is characterized by that information is recorded and reproduced when the recording layer is irradiated from the side or the opposite side of the substrate with a laser beam.

Moreover, the optical information recording medium to which the present invention is applied comprises a recording layer and a write-protect layer. The recording layer is made of a crystalline phase-change recording material, and information is recorded by irradiating the recording layer with light having a wavelength of 500 nm or less. The write-protect layer is provided to abut on the recording layer and prevents information recorded on the recording layer from being overwritten by light irradiation. This write-protect layer can be characterized by containing an element or a compound which, by being combined with a phase-change material, generates a substance to prevent the information recorded on the recording layer from being overwritten. More specifically, the write-protect layer is characterized by containing a metal containing compound (e.g., a metal oxide or nitride compound) capable of releasing $O_2$ and/or $N_2$ upon being chemically or physically changed at a temperature of 600° C. or more, and more preferably at a temperature of 800° C. or more. Preferably, the write-protect layer is characterized by containing at least cobalt (II) cobalt (IV) oxide.

Furthermore, the recording layer is characterized by that the recording layer does not change from the amorphous phase, formed by changing the phase-change material, to the crystalline phase when the recording layer in the amorphous phase is irradiated with continuous light.

In a preferred embodiment, the optical information recording medium to which the present invention is applied comprises a substrate and a crystalline recording layer and can be characterized by a layer containing at least a cobalt element or a cobalt compound that is formed on one side or both sides of the recording layer. This recording layer is characterized in that the cobalt element or the cobalt compound changes physically or chemically when the recording layer is irradiated with light having a wavelength of 500 nm or less to change from a crystalline phase to an amorphous phase. In addition, the recording layer comprises a layer containing a cobalt element or a cobalt compound whose crystalline structure changes at around 900° C.

Furthermore, the present invention encompasses a method of recording and reproducing information on and from the optical information recording medium of the present invention, wherein the optical information recording medium comprises a recording layer and a write-protect layer. The recording layer is formed on a substrate and is made of a crystalline phase-change recording material, and the write-protect layer is provided and abuts on the recording layer to prevent amorphous recording marks formed on the recording layer from being erased. A method of recording and reproducing information on and from the optical information recording medium is characterized by irradiating the recording layer with light with a wavelength of 500 nm or less from the side or the opposite side of the substrate to record and reproduce information.

Notably, the recording layer can be formed on the surface of the substrate not only directly, but also indirectly through other layers such as a reflective layer, a dielectric layer and a protective layer interposed between the substrate and recording layer as necessary in the optical information recording medium to which the present invention is applied.

DESCRIPTION OF THE PREFERRED EMBODIMENTS

Detailed below with reference to the drawings are an optical information recording medium and a method of recording and reproducing information on and from an optical information recording medium to which the present invention is applied. However the following embodiments are in no way to be construed as being limiting to the present invention being claimed, and the equivalents thereof, which would be recognized and understood by those of ordinary skill in the art desiring to practice the invention. Likewise it is noted that various changes and substitutions can be made in the materials and procedures set forth herein, without departing from the spirit or scope of the instant invention.

First Embodiment

Figure 1:
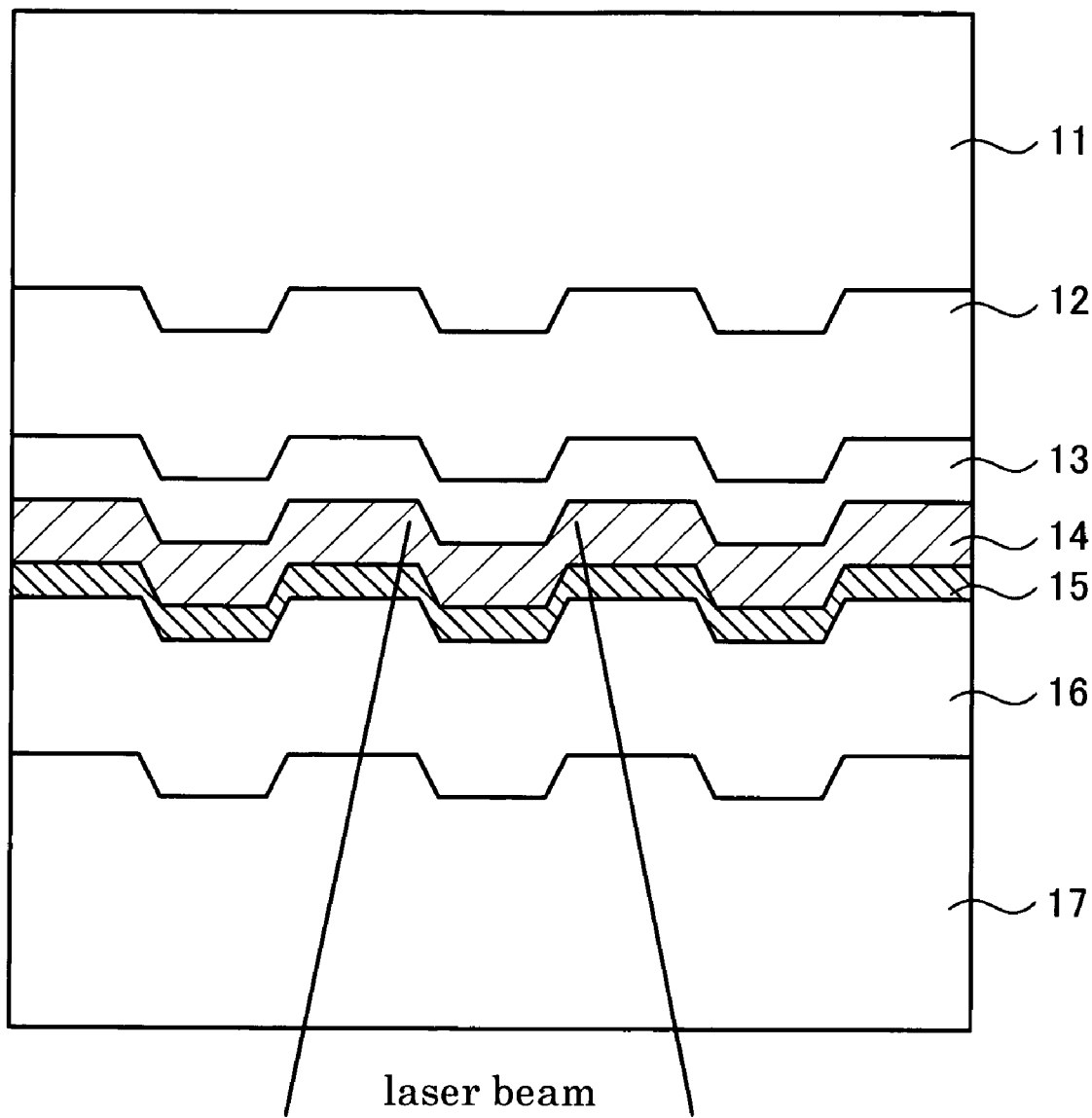
FIG. 1 is a view for explaining the structure of an optical information recording medium in a first embodiment to which the present invention is applied.

FIG. 1 is a view for explaining the structure of an optical information recording medium in the first embodiment to which the present invention is applied. A single-panel optical disk of a film incident light type shown herein is laminated by in the order of a transparent substrate 11, a reflective layer 12, a first dielectric layer 13, a recording layer 14, a write-protect layer 15 and a second dielectric layer 16. Further, UV curing resin forms a transparent cover layer 17 on the second dielectric layer 16. The recording layer 14 is made of a phase-change material, and the write-protect layer 15 is provided to abut on the side of the recording layer 14, where a laser beam enters from. The laser beam passes through the cover layer 17, the second dielectric layer 16 and the write-protect layer 15 to enter the recording layer 14, thereby recording and reproducing information. Herein, a laser beam with a wavelength of 500 nm or less is used for recording and reproducing information for example.

The substrate 11 is created by injection molding in which, for example, grooves with a width of 0.16 μm and a depth of 24 nm are formed with a pitch of 0.32 μm on a surface of polycarbonate resin plate with a diameter of 120 mm and a thickness of 1.1 mm. In this substrate 11, disk recognition information, address information and the like are recorded on groove wobbles in advance. These pieces of information can be also recorded on pre-pits. Note that either the grooves or the spaces between the grooves are employed as information recording tracks.

The material of the substrate 11 is not particularly limited. However, acrylate series resin, methacrylate series resin, polycarbonate resin, polyolefin series resin (especially, amorphous polyolefin), polyester series resin, polystyrene resin, epoxy resin, glass, a resin layer made of photo-curing resin such as radiation curing resin provided on glass and the like have been conventionally used as a substrate material. Any of these can be used as a material for the substrate 11. In terms of high productivity, manufacturing costs and hygroscopic resistance, injection molding polycarbonate is more preferable.

The reflective layer 12 is constituted of metal or alloy, and the thickness thereof ranges from 50 to 200 nm. More specifically, for example, Au, Al, Ag, Cu, Ti, Cr, Ni, Pt, Ta, Cr and Pd can be used as single metal or alloyed. Furthermore, in addition to using these as a main constituent, the reflective layer 12 may contain metal or semimetal such as Mg, Se, Hf, V, Nb, Ru, W, Mn, Re, Fe, Co, Rh, Ir, Cu, Zn, Cd, Ga, In, Si, Ge, Te, Pb, Po, Sn and Bi.

The thickness of the first dielectric layer 13 ranges from 15 to 35 nm, and the thickness of the second dielectric layer 16 ranges from 50 to 150 nm. The first dielectric layer 13 and the second dielectric layer 16 are provided on both sides of the recording layer 14. Materials of the first dielectric layer 13 and the second dielectric layer 16 are not particularly limited. However, for example, a mixture of ZnS and $SiO_2$, oxides such as $SiO_2$, $Al_2O_3$, $Cr_2O_3$, $SnO_2$ and $Ta_2O_5$, nitrides including SiN, GeN, TaN and AlN and the like can be used as the materials.

The recording layer 14 is made of a phase-change recording material and is a phase-change crystalline recording layer with a thickness of 6 to 20 nm. The recording layer 14 made of the phase-change recording material is excellent that the layer 14 hardly deforms. Data is read and written from and on the phase-change crystalline recording layer by a phase change of a substance between crystalline and amorphous phases. Specific examples of the phase-change recording material are Sb—Te series, Ge—Te series, Ge—Sb—Te series, In—Sb—Te series, Ag—In—Sb—Te series, MA-Ge—Sb—Te series (MA is at least one of Au, Cu, Pd, Ta, W, Ir, Sc, Y, Ti, Zr, V, Nb, Cr, Mo, Mn, Fe, Ru, Co, Rh, Ni, Ag, Tl, S, Se and Pt), Sn—Sb—Te series, In—Se—Tl series, In—Se—Tl-MB series (MB is at least one of Au, Cu, Pd, Ta, W, Ir, Sc, Y, Ti, Zr, V, Nb, Cr, Mo, Mn, Fe, Ru, Co, Rh, Ni, Ag, Ti, S, Se and Pt) and Sn—Sb—Se series.

In the present embodiment, the recording layer 14 is formed by use of the phase-change recording material. A laser beam with a wavelength of, for example, 500 nm or less is made to enter the recording layer 14 from the side of the transparent cover layer 17, which is disposed opposite to the substrate 11, to record and reproduce information. The laser beam can also be made enter from the side of the substrate 11 to record and reproduce information. The melting point of the phase-change recording material constituting the recording layer 14 is at least 300° C. or more, preferably 300° C. to 800° C. and more preferably 600° C. to 700° C.

The write-protect layer 15 is a thin layer which contains an element or a compound. The element and the compound are physically or chemically stable at a temperature of around 200° C. and changes physically or chemically at 600° C. or more, and more preferably at 800° C. or more. In the present embodiment, the write-protect layer 15 is provided to abut on the side of the recording layer 14 made of the phase-change recording material, where the laser beam enters from. Herein, examples of the physical or chemical changes at 600° C. or more are decomposition, fusion, phase transformation, a phase change and a change in the crystal structure. In an optical disk of a film incident light type to which the present embodiment is applied, when the recording layer 14 constituted of the phase-change recording material is irradiated with the laser beam to be initialized, a temperature thereof reaches approximately 200° C. In addition, when the recording layer 14 is irradiated with a blue laser beam to change the phase-change recording material from the crystalline phase to the amorphous phase for recording information, temperature is estimated to be approximately 600° C. or more. Thus, in the present embodiment, it is presumed that the write-protect layer 15 maintains a stable state at the temperature of when the recording layer 14 is initialized. On the other hand, the write-protect layer 15 physically and chemically changes at the temperature of when the recording layer 14 is irradiated by the blue laser beam to change the phase-change recording material from the crystalline phase to the amorphous phase and record information.

In the optical disk of the film incident light type of the present embodiment, the write-protect layer 15 is provided to abut on the side of the recording layer 14, where the laser beam enters from. Accordingly, the amorphous recording marks will not change back to the crystalline phase even when the amorphous recording marks are irradiated with light continuously to crystallize to erase the information recorded on the recording layer 14. Consequently, the recorded information is not erased, and it is impossible to overwrite new information. As a result, the recording layer 14 made of the phase-change (crystalline/amorphous) recording material can be used for the write-once medium.

The write-protect layer 15 is preferably formed as a thin layer containing a metal containing compound that releases $O_2$ and/or $N_2$ upon being chemically or physically changed at a temperature of 600° C. or more, and more preferably at a temperature of 800° C. or more. The write-protect layer 15 is also preferably formed as a thin layer containing at least a Co (cobalt) element or a cobalt compound. The thickness of the write-protect layer 15 is formed to range from 1 to 5 nm. If the write-protect layer 15 is extremely thin, overwriting is enabled. If the write-protect layer 15 is extremely thick, the light absorptance increases, and the recording sensitivity reduces. An example of the cobalt compound is cobalt (II) cobalt (IV) oxide ($Co_3O_4$). The cobalt (II) cobalt (IV) oxide maintains a stable state at a temperature of approximately 200° C. and decomposes at a temperature in a range from 800° C. to 1000° C. It is well known that the cobalt (II) cobalt (IV) oxide changes into cobalt (II) oxide (CoO) at a temperature of approximately 900° C., and thereby releases $O_2$ (Constitution of Binary Alloys Second Edition: McGraw-HILL BOOK COMPANY, 1985, P487–P488). Herein, the crystal structure changes from the spinel structure of the cobalt (II) cobalt (IV) oxide to the NaCl structure of the cobalt (II) oxide.

The thickness of the cover layer 17 is formed to be 30 to 100 μm. UV curing resin, in which a prepolymer constituent and a monomer constituent are cured by use of photopolymerization initiator such as benzophenone and benzoin ether, can be used as the material of the cover layer 17. Examples of the prepolymer constituent are polyester acrylate, polyurethane acrylate, epoxy acrylate and polyether acrylate and the like. Examples of the monomer constituent include materials such as dicyclopentanyl diacrylate, ethylene oxide (EO) denatured bisphenol A acrylate, trimethylpropane triacrylate and EO denatured trimethylolpropane triacrylate dipentaerythritol hexacrylate.

Each layer stacked on the substrate 11 in the present embodiment is formed by the following method as an example, although the present invention is not limited thereto: a sputtering apparatus has a plurality of sputtering chambers and is excellent for uniformity and repeatability of the thickness of the films. First, the substrate 11 is installed in a load locking chamber of the sputtering apparatus. Second, after the substrate 11 is moved to the first sputtering chamber, $Ag_{98}Ru_1Au_1$ (atom %) is employed as a target to form an $Ag_{98}Ru_1Au_1$ reflective layer 12 with a thickness of 50 nm in argon gas. Third, after the substrate 11 is moved to the second sputtering chamber, a mixture of ZnS and $SiO_2$ is employed as a target to form a $(ZnS)_{80}(SiO_2)_{20}$ (mol %) first dielectric layer 13 with a thickness of 20 nm in argon gas. Fourth, after the substrate 11 is moved to the third sputtering chamber, a $Ge_{33}Sb_{13}Te_{54}$ (atom %) sintered body is employed as a target to form a $Ge_{33}Sb_{13}Te_{54}$ recording layer 14 with a thickness of 15 nm in argon gas. Fifth, after the substrate 11 is moved to the fourth sputtering chamber, a $Co_3O_4$ (atom %) sintered body is employed as a target to form a $CO_3O_4$ (atom %) write-protect layer 15 with a thickness of 3 nm in argon gas. Sixth, the substrate 11 is moved to the fifth sputtering chamber to form a $(ZnS)_{80}(SiO_2)_{20}$ (mol %) second dielectric layer 16 with a thickness of 55 nm in the same way as forming the first dielectric layer 13. Finally, the substrate 11 laminated by each layer is removed from the sputtering apparatus, and a cover layer 17 with a thickness of 0.1 mm is formed on the $(ZnS)_{80}(SiO_2)_{20}$ (mol %) second dielectric layer 16, the uppermost layer, by use of UV curing resin.

Initialization of the recording layer 14 of the optical disk of the film incident light type in the present embodiment is performed by laser irradiation, having elliptical beams with, for example, a wavelength of 810 nm, a major axis of 96 μm and a minor axis of 1 μm. Information is recorded and reproduced on and from the grooves as follows: the initialized optical disk is rotated at a linear velocity of 5.28 m/sec; an objective lens with a numerical aperture of 0.85 focuses, for example, semiconductor laser beams with a wavelength of 405 nm; and tracking control is performed by a push-pull method through the cover layer 17. For the recording, a waveform in which laser power is modulated between 4.5 mW and 0.3 mW is employed, and a multi-pulse recording waveform is used for dividing recording pulses.

A carrier-to-noise (C/N) ratio was measured by use of a spectrum analyzer in the optical disk of the film incident light type of the present embodiment. The conditions were as follows: a single pattern was recorded on a groove; reproducing power was set to 0.3 mW; resolution bandwidth was set to 30 kHz; and video bandwidth was set to 10 Hz. When information was recorded on an unrecorded track with a recording frequency of 4.1 MHz, a C/N ratio of 58.5 dB was obtained. Furthermore, when information was recorded on an unrecorded track with a recording frequency of 11.0 MHz, a C/N ratio of 54.5 dB was obtained. Herein, when the information was recorded with the recording frequency of 4.1 MHz, a length of an amorphous recording mark was approximately 0.64 μm. When the information was recorded with the recording frequency of 11.0 MHz, a length of an amorphous recording mark was approximately 0.24 μm.

By providing the write-protect layer 15 to abut on the side of the recording layer 14, which a laser beam enters from, amorphous recording marks will not change back to the crystalline phase even when continuous light irradiation is performed on the amorphous recording marks for crystallization in the recording layer 14 of the optical disk of the film incident light type in the present embodiment. More specifically, signals are recorded on a track with a recording frequency of 4.1 MHz, and continuous light with laser power of 1.5 mW is irradiated on this track for 30 times.

Thereafter, although a single pattern is overwritten with a recording frequency of 11.0 MHz, a C/N ratio of only 51.0 dB is obtained, a 3.0 dB decrease in the C/N ratio compared with the case where a single pattern is recorded on an unrecorded track with a recording frequency of 11.0 MHz. The result indicates that the recording layer 14 cannot be overwritten, in other words, the optical disk of the film incident light type of the present embodiment can be used as a write-once medium which employs a phase-change recording material used for a rewritable medium.

In the optical disk of the film incident light type of the present embodiment, by providing the write-protect layer 15 to abut on the recording layer 14, amorphous recording marks do not change back to the crystalline phase even when continuous light irradiation on the amorphous recording marks is performed for crystallization. Thus, the recording layer 14 cannot be overwritten. The reason is not clarified yet, but is assumed to be as follows, however, the present invention is by no means to be construed as being limited thereto or thereby: the recording layer 14 is irradiated with a blue laser beam to fuse the crystalline recording layer made of a phase-change recording material and form amorphous recording marks; in this case, a temperature at the center of the fusion portion is estimated to be approximately 1000° C.; accordingly metal of the fusion portion and oxygen atoms of the cobalt (II) cobalt (IV) oxide constituting the write-protect layer 15 are bonded to generate new substances; these new substances are assumed to prevent the crystallization of the amorphous recording marks.

Another possible reason is assumed to be as follows, although once again the present invention is by no means to be construed as being limited thereto or thereby: the cobalt (II) cobalt (IV) oxide changes to cobalt (II) oxide at a temperature of around 900° C., and thus the crystal structure changes from the spinel structure of the cobalt (II) cobalt (IV) oxide to the NaCl structure of the cobalt (II) oxide. In other words, since the cobalt (II) cobalt (IV) oxide is a mixed valence oxide where bivalent $Co^{2+}$ ion and trivalent $Co^{3+}$ ion exist in one unit cell, the crystal structure thereof is unstable, and thereby causing defects on the crystal surface. By contrast, $Co^{2+}$ of the cobalt (II) oxide forms a cube with oxygen atoms, and thus the crystal structure of the cobalt (II) oxide is stable. Therefore, the crystal surface is resistant to defects. It is widely known that defects on the crystal surface exceedingly facilitate the generation of crystal nucleus. Hence, when the recording layer 14 is fused to record information, the write-protect layer 15 changes from the cobalt (II) cobalt (IV) oxide to the cobalt (II) oxide, and thereby the crystal nucleus is hardly generated on the border between the amorphous recording marks of the recording layer 14 and the write-protect layer 15. Therefore, it is difficult to recrystallize the portion that became amorphous.

Note that it is impossible to perform direct overwriting on the $Ge_{33}Sb_{13}Te_{54}$ recording layer 14, made of the phase-change recording material, of the optical disk of the film incident light type in the present embodiment by use of a laser beam with a wavelength of 405 nm. To be more specific, signals are recorded on a track with a recording frequency of 4.1 MHz. Although signals are overwritten on the track with a recording frequency of 11.0 MHz, a C/N ratio decreases by 4.5 dB compared with the case where a single pattern is recorded on an unrecorded portion with a recording frequency of 11.0 MHz. The result indicates that the laser beam with a wavelength of 405 nm cannot over-write the signals.

Moreover, in the case where the optical disk of the film incident light type of the present embodiment is not initialized by use of a laser beam with a wavelength of 810 nm, for example, when a semiconductor laser beam with a wavelength of 405 nm attempts to record and reproduce information by use of an objective lens with a numerical aperture of 0.85, it is difficult to control the tracking. Even when a land/groove recording is performed by use of a recording frequency of 4.1 MHz as the tracking is controlled, recording and reproducing signal amplitude decreases to less than one-tenth of that of the case where the initialization takes place. Although groove recording of the substrate 11 is explained in the present embodiment, the same effects can be obtained when the information is recorded on the lands or on both lands and grooves.

Second Embodiment

Figure 2:
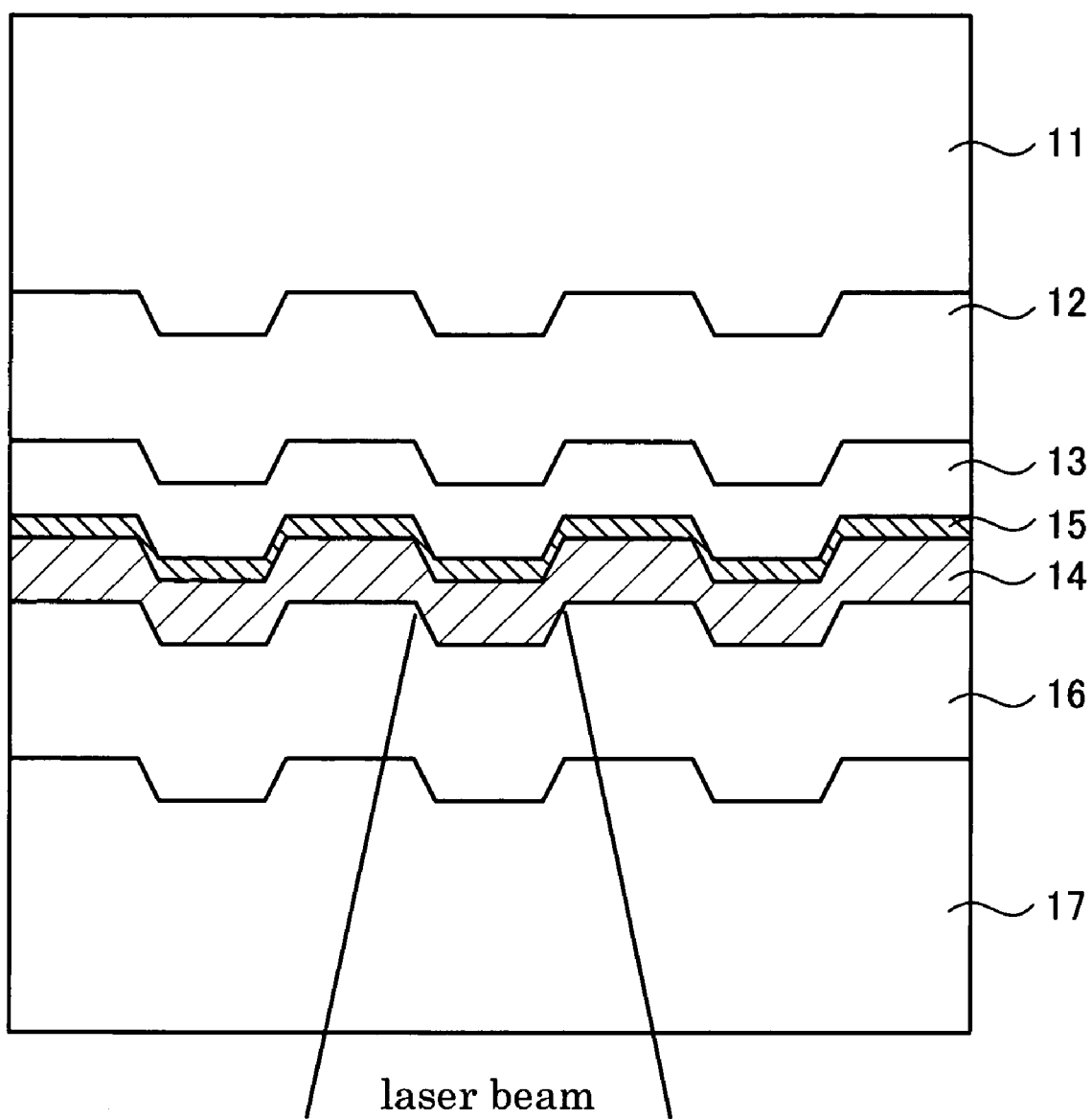
FIG. 2 is a view for explaining the structure of an optical information recording medium in a second embodiment to which the present invention is applied.

FIG. 2 is a view for explaining the structure of the optical information recording medium in a second embodiment. In a single-panel optical disk of a film incident light type shown herein, a write-protect layer 15 is provided to abut on a side of a recording layer 14, which is opposite the side which a laser beam enters from. As shown in FIG. 2, sequentially stacked on a substrate 11 are a 50 nm-thick $Ag_{98}Ru_1Au_1$ reflective layer 12, a 18 nm-thick $(ZnS)_{80}(SiO_2)_{20}$ (mol %) first dielectric layer 13, a 3 nm-thick $Co_3O_4$ (atom %) write-protect layer 15, a 15 nm-thick $Ge_{33}Sb_{13}Te_{54}$ (atom %) recording layer 14, a 60 nm-thick $(ZnS)_{80}(SiO_2)_{20}$ (mol %) second dielectric layer 16 and a cover layer 17. Each layer is formed in the same way as the first embodiment.

By providing the write-protect layer 15 on the side of the recording layer 14, opposite to the side which the laser beam enters from, the recording layer 14 of the optical disk of the film incident light type in the present embodiment cannot be overwritten even when continuous light irradiation is performed on amorphous recording marks for crystallization, similar to the first embodiment. More specifically, signals are recorded on an unrecorded track with a recording frequency of 4.1 MHz, and continuous light irradiation on the track for 30 times with laser power of 1.5 mW is performed. When a single pattern is overwritten on the track with a recording frequency of 11.0 MHz, a C/N ratios decreases by 2.5 dB compared with the case where the signals are recorded on the unrecorded track.

Moreover, similar to the first embodiment, direct overwriting cannot be performed on the recording layer 14 by use of a laser beam with a wavelength of 405 nm. More specifically, although a C/N ratio of 58.0 dB is obtained when signals are recorded with a recording frequency of 4.1 MHz, a C/N ratio decreases by 3.5 dB compared with the case the signals are recorded on an unrecorded track when the signals are overwritten with a recording frequency of 11.0 MHz.

Third Embodiment

Figure 3:
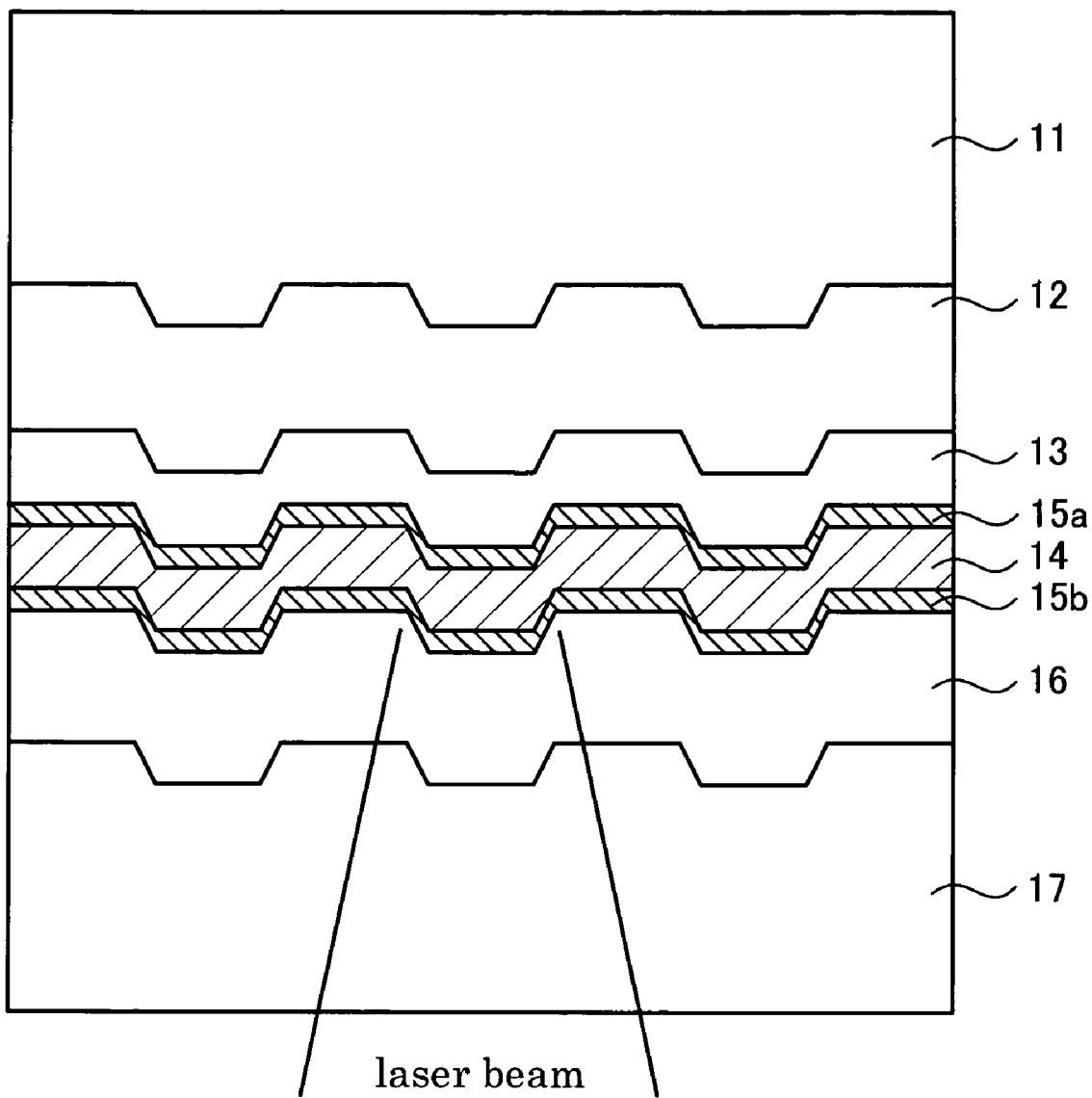
FIG. 3 is a view for explaining the structure of an optical information recording medium in a third embodiment to which the present invention is applied.

FIG. 3 is a view for explaining the structure of the optical information recording medium in a third embodiment. In a single-panel optical disk of a film incident light type shown herein, two write-protect layers are provided on both sides of a recording layer 14. As shown in FIG. 3, sequentially stacked on a substrate 11 are a 50 nm-thick $Ag_{98}Ru_1Au_1$ (atom %) reflective layer 12, a 18 nm-thick $(ZnS)_{80}(SiO_2)_{20}$ (mol %) first dielectric layer 13, a 2 nm-thick $CO_3O_4$ (atom %) first write-protect layer 15a, a 15 nm-thick $Ge_{33}Sb_{13}Te_{54}$ (atom %) recording layer 14, a 2 nm-thick $Co_3O_4$ (atom %) second write-protect layer 15b, a 60 nm-thick $(ZnS)_{80}(SiO_2)_{20}$ (mol %) second dielectric layer 16 and a cover layer 17.

By providing the first and second write-protect layers 15a and 15b on both sides of the recording layer 14, the recording layer 14 of the optical disk of the film incident light type in the present embodiment cannot be overwritten even when continuous light irradiation on amorphous recording marks for crystallization is performed, similar to the first embodiment. More specifically, signals are recorded on an unrecorded track with a recording frequency of 4.1 MHz, and continuous light irradiation on the track for 30 times with laser power of 1.5 mW is performed. When a single pattern is overwritten on the track with a recording frequency of 11.0 MHz, a C/N ratio decreases by 3.5 dB compared with the case where the signals are recorded on an unrecorded track.

Moreover, similar to the first embodiment, direct overwriting cannot be performed on the recording layer 14 by use of a laser beam with a wavelength of 405 nm. Although a C/N ratio of 57.5 dB is obtained when signals are recorded with a recording frequency of 4.1 MHz, a C/N ratio decreases by 4.0 dB compared with the case signals are recorded on an unrecorded track when the signals are overwritten with a recording frequency of 11.0 MHz.

Figure 4:
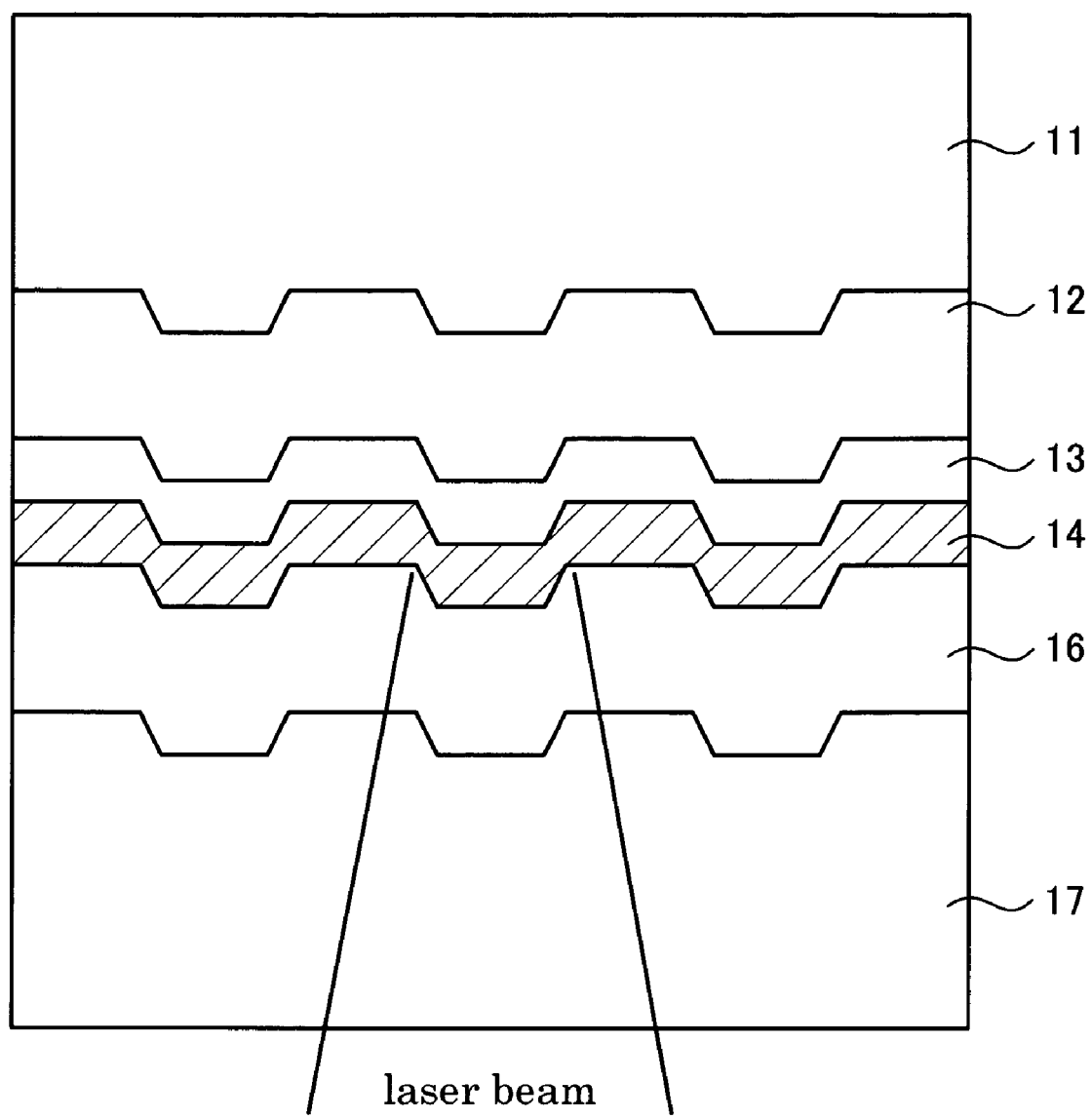
FIG. 4 is a view for explaining the structure of a conventional optical information recording medium.

FIG. 4 is a view for explaining the structure a conventional optical information recording medium. FIG. 4 shows a single-panel optical disk of a film incident light type without a write-protect layer. As shown in FIG. 4, sequentially stacked on a substrate 11 are a 50 nm-thick $Ag_{98}Ru_1Au_1$ (atom %) reflective layer 12, a 20 nm-thick $(ZnS)_{80}(SiO_2)_{20}$ (mol %) first dielectric layer 13, a 15 nm-thick $Ge_{33}Sb_{13}Te_{54}$ (atom %) recording layer 14, a 60 nm-thick $(ZnS)_{80}(SiO_2)_{20}$ (mol %) second dielectric layer 16 and a cover layer 17.

Signals are recorded on an unrecorded track with a recording frequency of 4.1 MHz in the optical disk of the film incident light type, the conventional optical information recording medium. Thereafter, continuous light irradiation on the track for three times with laser power of 1.5 mW is performed, and a single pattern is overwritten with a recording frequency of 11.0 MHz. Consequently, a C/N ratio of 55.0 dB is obtained, the same as the case where signals are recorded on the unrecorded track with a recording frequency of 11.0 MHz. This result shows that the conventional optical information recording medium cannot be used as a write-once medium. It is because if the continuous light irradiation on the recording layer 14 is performed for a number of times, the amorphous recording marks are crystallized. Thus, overwriting is enabled in the case where a $Co_3O_4$ (atom %) write-protect layer is not formed to abut on the $Ge_{33}Sb_{13}Te_{54}$ recording layer 14.

However, direct overwriting cannot be performed in the optical disk of the film incident light type, the conventional optical information recording medium, by use of a laser beam with a wavelength of 405 nm. To be more specific, when signals are recorded with a recording frequency of 4.1 MHz, a C/N ratio of 59.0 dB can be obtained. When signals are recorded on a track with a recording frequency of 4.1 MHz and other signals are overwritten on the track with a recording frequency of 11.0 MHz, a C/N ratio decreases by 1.0 dB compared with the case where signals are recorded on an unrecorded track with a recording frequency of 11.0 MHz.

Fourth Embodiment

Figure 5:
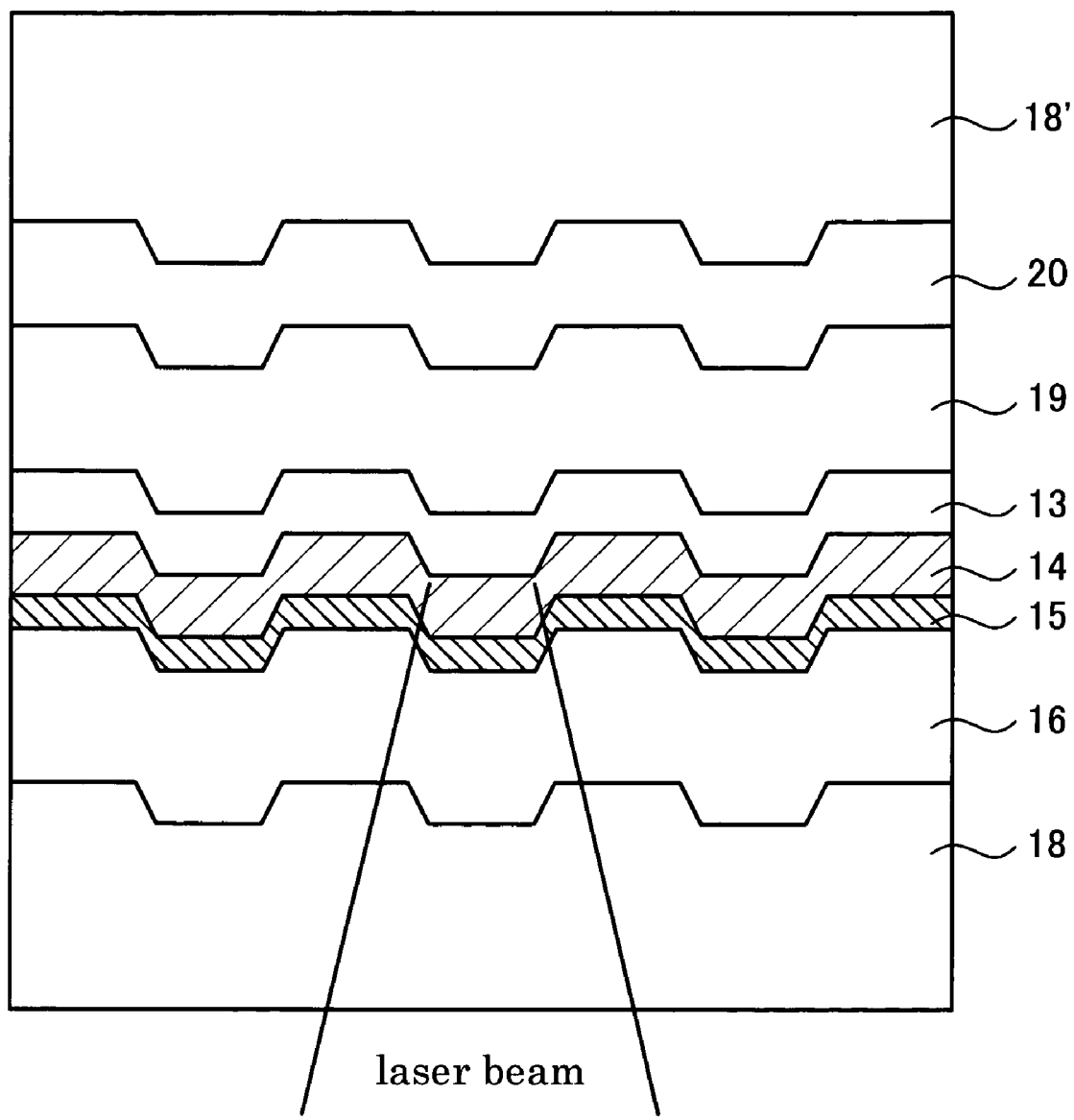
FIG. 5 is a view for explaining the structure of an optical information recording medium in a fourth embodiment to which the present invention is applied.

FIG. 5 is a view for explaining the structure of an optical information recording medium in the fourth embodiment. In a laminated optical disk of a substrate incident light type shown herein, a write-protect layer 15 is provided to abut on the side of the recording layer 14 which a laser beam enters from. As shown in FIG. 5, sequentially stacked on a substrate 18 are a 40 nm-thick $(ZnS)_{80}(SiO_2)_{20}$ (mol %) second dielectric layer 16, a 2 nm-thick $Co_3O_4$ (atom %) write-protect layer 15, a 20 nm-thick $Ge_{33}Sb_{13}Te_{54}$ (atom %) recording layer 14, a 20 nm-thick $(ZnS)_{80}(SiO_2)_{20}$ (mol %) first dielectric layer 13 and a 100 nm-thick $Al_{99}Ti_1$ (wt %) reflective layer 19. A 0.6 mm-thick polycarbonate resin plate 18' is bonded with the reflective layer 19 by UV curing resin adhesive layer 20 interposed there between. Note that a laser beam irradiation on the recording layer 14 is performed from the side of the substrate 18.

In the substrate 18, by injection molding, grooves with a width of 0.34 μm and a depth of 30 nm are formed at a pitch of 0.68 μm on the surface of the polycarbonate resin plate with a diameter of 120 mm and a thickness of 0.6 mm. Disk recognition information and address information are recorded on groove wobbles of the substrate 18 in advance. These pieces of information can also be recorded on pre-pits. On this substrate 18, the second dielectric layer 16, the write-protect layer 15, the recording layer 14, the first dielectric layer 13 and the reflective layer 19 are sequentially formed. The UV curing resin adhesive layer 20 is formed on the uppermost layer by spincoating and bonded with the polycarbonate resin plate 18' with a diameter of 120 mm and a thickness of 0.6 mm, on which thin films are not formed. Note that the initialization conditions and method of the recording layer 14 of the optical disk of the substrate incident light type thus created are the same as those explained in the first embodiment.

By providing the write-protect layer 15 on the side of the recording layer 14, where a laser beam enters from, overwriting cannot be performed on the recording layer 14 of the laminated optical disk of the substrate incident light type in the present embodiment even when continuous light irradiation is performed on amorphous recording marks for crystallization, similar to the first embodiment. More specifically, signals are recorded on an unrecorded track with a recording frequency of 4.1 MHz. Thereafter, continuous light irradiation on the track for 30 times with laser power of 1.5 mW is performed. Thus, even when a signal pattern is overwritten on the track with a recording frequency of 11.0 MHz, a C/N ratio decreases by 3.0 dB compared with the case where the signals are recorded on an unrecorded track.

In addition, direct overwriting cannot be performed on the recording layer 14 of the laminated optical disk of the substrate incident light type by use of a laser beam with a wavelength of 405 nm. More specifically, when signals are recorded on a track with a recording frequency of 4.1 MHz, a C/N ratio of 54.5 dB can be obtained. However, when the track is overwritten with a recording frequency of 11.0 MHz, a C/N ratio decreases by 5.0 dB compared with the case where signals are recorded on an unrecorded track.

Fifth Embodiment

An optical information recording medium in a fifth embodiment is a laminated optical disk of a substrate incident light type and has a structure in which a write-protect layer is provided to abut on the side of a recording layer, opposite the side which a laser beam enters from. Since the optical information recording medium in the fifth embodiment has substantially the same structure as that in the fourth embodiment, the drawing thereof is omitted. In the laminated optical disk of the substrate incident light type in the present embodiment, sequentially stacked on a substrate are a 40 nm-thick $(ZnS)_{80}(SiO_2)_{20}$ (mol %) second dielectric layer, a 20 nm-thick $Ge_{33}Sb_{13}Te_{54}$ recording layer, a 2 nm-thick $Co_3O_4$ (atom %) write-protect layer, a 20 nm-thick $(ZnS)_{80}(SiO_2)_{20}$ (mol %) first dielectric layer and a 100 nm-thick $Al_{99}Ti_1$ (wt %) reflective layer. A 0.6 mm-thick polycarbonate resin plate with a diameter of 120 mm, on which no thin layers are formed, is bonded with the reflective layer by UV curing resin adhesive layer interposed there between. Note that the recording layer is irradiated with a laser beam from the side of the substrate.

By providing the write-protect layer on the side of the recording layer, opposite to the side which the laser beam enters from, overwriting cannot be performed on the recording layer of the laminated optical disk of the substrate incident light type in the present embodiment. It is because even when continuous light irradiation on amorphous recording marks for crystallization is performed, the amorphous portions do not change back to the crystalline phase. More specifically, signals are recorded on an unrecorded track with a recording frequency of 4.1 MHz. Thereafter, continuous light irradiation on the track for 30 times with laser power of 1.5 mW is performed. Consequently, when a single pattern is overwritten on the track with a recording frequency of 11.0 MHz, a C/N ratio decreases by 2.0 dB compared with the case where the signals are recorded on an unrecorded track.

Furthermore, direct overwriting cannot be performed on the recording layer by use of a laser beam with a wavelength of 405 nm. More specifically, when signals are recorded on an unrecorded track with a recording frequency of 4.1 MHz, a C/N ratio of 54.0 dB can be obtained. However, when the signals are overwritten on the track with a recording frequency of 11.0 MHz, a C/N ratio decreases by 2.5 dB compared with the case where the signals are recorded on an unrecorded track.

Sixth Embodiment

An optical information recording medium in a sixth embodiment is a laminated optical disk of a substrate incident light type and has a structure in which two write-protect layers are provided to abut on both sides of one recording layer. Since the optical information recording medium in the sixth embodiment has the same structure as that in the aforementioned forth and fifth embodiments, except that a second write-protect layer is also used as in the third embodiment (see FIGS. 3 and 5), the drawing thereof is omitted. In the laminated optical disk of the substrate incident light type in the present embodiment, sequentially stacked on a substrate are a 40 nm-thick $(ZnS)_{80}(SiO_2)_{20}$ (mol %) second dielectric layer, a 2 nm-thick $Co_3O_4$ (atom %) first write-protect layer, a 20 nm-thick $Ge_{33}Sb_{13}Te_{54}$ recording layer, a 2 nm-thick $Co_3O_4$ (atom %) second write-protect layer, a 20 nm-thick $(ZnS)_{80}(SiO_2)_{20}$ (mol %) first dielectric layer and a 100 nm-thick $Al_{99}Ti_1$ (wt %) reflective layer. A 0.6 mm-thick polycarbonate resin plate with a diameter of 120 mm, on which no thin films are formed, is bonded with the reflective layer to create the optical information recording medium.

By providing the write-protect layers on both sides of the recording layer, overwriting cannot be performed on the recording layer of the laminated optical disk of the substrate incident light type in the present embodiment even when continuous light irradiation on amorphous recording marks for crystallization is performed. More specifically, signals are recorded on an unrecorded track with a recording frequency of 4.1 MHz, and continuous light irradiation on the track for 30 times with laser power of 1.5 mW is performed. Consequently, even when a single pattern is overwritten on the track with a recording frequency of 11.0 MHz, a C/N ratio decreases by 3.0 dB compared with the case where the signals are recorded on an unrecorded track.

Moreover, direct overwriting cannot be performed on the recording layer by use of a laser beam with a wavelength of 405 nm. To be more specific, when signals are recorded on an unrecorded track with a recording frequency of 4.1 MHz, a C/N ratio of 53.0 dB can be obtained. However, when the signals are overwritten on the track with a recording frequency of 11.0 MHz, a C/N ratio decreases by 3.5 dB compared with the case where the signals are recorded on an unrecorded track.

Note that, in a conventional laminated optical disk of a substrate incident light type without a write-protect layer, for example, sequentially stacked on a substrate are a 40 nm-thick $(ZnS)_{80}(SiO_2)_{20}$ (mol %) second dielectric layer, a 20 nm-thick $Ge_{33}Sb_{13}Te_{54}$ recording layer, a 20 nm-thick $(ZnS)_{80}(SiO_2)_{20}$ (mol %) first dielectric layer and a 100 nm-thick $Al_{99}Ti_1$ (wt %) reflective layer. A 0.6 mm-thick polycarbonate resin plate with a diameter of 120 mm, on which no thin films are formed, is bonded with the reflective layer to create the optical information recording medium.

By use of a laser beam with a wavelength of 405 nm, direct overwriting cannot be performed on the recording layer of the laminated optical disk of the substrate incident light type either, which is a conventional optical information recording medium. However, when continuous light irradiation on the recording layer is performed for a number of times, amorphous recording marks are crystallized. Thus, overwriting is enabled, and the conventional optical information recording medium cannot be used as a write-once medium.

Therefore, according to the present invention, it is possible to produce an optical information recording medium which employs a phase-change recording material and is utilized as a write-once medium.

Each of the patents, patent documents and publications referenced herein are incorporated herein by reference in their entirety.

What is claimed is:

1. An optical information recording medium, comprising:
   a substrate;
   a recording layer which is provided on the substrate and records information by receiving light irradiation, which causes a phase change from a crystalline phase to an amorphous phase; and
   a write-protect layer which is provided in an abutting position to the recording layer and prevents the recording layer from changing from the amorphous phase, formed by the phase change, to the crystalline phase, wherein the write-protect layer contains a cobalt element or a cobalt compound.

2. The optical information recording medium according to claim 1, wherein the write-protect layer contains an element or a compound which physically or chemically changes at a temperature of 600° C. or more.

3. The optical information recording medium according to claim 1, wherein the write-protect layer comprises a metal containing compound that is physically or chemically stable at a temperature of around 200° C., and which releases $O_2$ or $N_2$ upon being chemically or physically changed at a temperature of 600° C. or more.

4. The optical information recording medium according to claim 1, wherein the write-protect layer is substantially free of Antimony (Sb).

5. The optical information recording medium according to any one of claims 1, 2, 3 or 4, wherein a thickness of the write-protect layer is 1 nm to 5 nm inclusive.

6. The optical information recording medium according to claim 1, wherein the recording layer is irradiated with a laser beam from a side of the substrate or an opposite side of the substrate to record and reproduce information.

7. An optical information recording medium, comprising:
a recording layer which is formed of a crystalline phase-change recording material and records information by being irradiated with a light having a wavelength of 500 nm or less; and
a write-protect layer which is provided in an abutting position to the recording layer and prevents information on the recording layer from being overwritten by irradiation of the light.

8. The optical information recording medium according to claim 7, wherein the write-protect layer comprises a metal containing compound that is physically or chemically stable at a temperature of around 200° C., and which releases $O_2$ or $N_2$ upon being chemically or physically changed at a temperature of 600° C. or more.

9. The optical information recording medium according to claim 7, wherein the write-protect layer contains a cobalt element or a cobalt compound.

10. The optical information recording medium according to claim 7, wherein the write-protect layer is substantially free of Antimony (Sb).

11. The optical information recording medium according to claim 7, wherein the write-protect layer contains cobalt (II) cobalt (IV) oxide.

12. The optical information recording medium according to claim 7, wherein the recording layer does not change from an amorphous phase to a crystalline phase when continuous light irradiation is performed on the amorphous phase formed by changing the phase-change recording material.

13. An optical information recording medium, comprising:
a substrate; and
a crystalline recording layer,
wherein a layer which contains a cobalt element or a cobalt compound is formed on one side or both sides of the recording layer.

14. The optical information recording medium according to claim 13, wherein the cobalt element or the cobalt compound physically or chemically changes when the recording layer is irradiated with light with a wavelength of 500 nm or less to change the recording layer from a crystalline phase to an amorphous phase.

15. The optical information recording medium according to claim 13, wherein the cobalt element or the cobalt compound has a crystal structure change at a temperature of approximately 900° C.

16. A method of recording and reproducing information on and from an optical information recording medium which comprises:
a recording layer formed on a substrate and made of a crystalline phase-change recording material; and
a write-protect layer which is provided in an abutting position to the recording layer to prevent amorphous recording marks formed on the recording layer from being erased, the method comprising the step of:
irradiating the recording layer with a laser beam having a wavelength of 500 nm or less from a side of the substrate or an opposite side of the substrate to record or reproduce information.

* * * * *